March 28, 1967   A. H. BITZER, JR   3,311,733
METHOD AND APPARATUS FOR PRECISION HEAT
TREATMENT OF COIL SPRINGS
Filed Sept. 24, 1963   4 Sheets-Sheet 2

Inventor
Albert H. Bitzer, Jr.
By
Attorney

United States Patent Office 3,311,733
Patented Mar. 28, 1967

3,311,733
METHOD AND APPARATUS FOR PRECISION
HEAT TREATMENT OF COIL SPRINGS
Albert H. Bitzer, Jr., Kenilworth, Ill. (% Illinois Coil
Spring Co., 2100 N. Major Ave., Chicago, Ill. 60639)
Filed Sept. 24, 1963, Ser. No. 310,987
15 Claims. (Cl. 219—50)

This invention relates to the manufacture of coil springs, and refers more particularly to a method and means for heat treating coil springs in order to give them a set such that they will have a specified deflected length when subjected to a specified deflecting load.

There are many applications in which a coil spring must deflect to exactly a specified length when a specified deflecting load is imposed upon it. As an example, small gasoline engines of the type used on power lawn mowers have an air vane governor in which there is a small expansion spring that must stretch to exactly a certain length when a specified tension force is applied to it. To the extent that such a governor spring does not have the specified length under specified tension force, it either permits the engine to exceed the maximum speed for which it was designed, to the detriment of its useful life, or it prevents the engine from attaining full speed, with the result that the engine does not develop its rated power.

Those skilled in the art are familiar with many other examples of requirements for both expansion and compression springs that will flex exactly to a specified deflected length when subjected to a specified deflecting load, as is evident from the fact that a number of different inspection instruments have been patented, each intended to facilitate determination of the deflected length that a spring will have under a given deflecting load or, what is essentially the same thing, the load force required to deflect a spring to a given length.

Heretofore, however, it has not been known how to make a coil spring so that it would assuredly meet such requirements. It was possible to design springs so that they would come reasonably close to predetermined specifications for deflected length under deflecting load, but it was always taken for granted that no two springs from the same production run would necessarily have an identical deflected length under a given load. Such variations from spring to spring were due to factors which have heretofore been considered unpredictable and uncontrollable except to very rough limits.

Hence the usual practice has been to design a coil spring as nearly as possible to specified requirements and then coil and heat treat a substantially larger number of such springs than was actually required. After heat treatment the entire production was inspected spring by spring. Those springs that met the specifications were accepted; the rest were scrapped.

Naturally the cost of the acceptable springs obtained by this procedure had to include a factor that took account of the cost of the scrapped rejects, which is to say that a spring manufacturer had to charge a relatively high price for precision springs that would deflect to exactly a specified length under a specified load. But even the higher price for such springs could not assure the manufacturer of making a profit on them because the percentage of rejects could not, by its very nature, be predicted with any degree of accuracy, especially on small production runs.

The general object of the present invention is to overcome these problems by providing a method and means for the heat setting of coil springs in such a manner that after such heat treatment each and every spring will have a specified deflected length when subjected to a specified deflecting load, thus at once eliminating the necessity for overproduction to insure the required quantity of acceptable springs and the need for a separate inspection operation other than a spot check for quality control.

Stated another way, it is the main object of this invention to eliminate the waste heretofore involved in the production of coil springs that are required to have a specified deflected load, and to thus lower the price of such precision springs to the customer while at the same time assuring the manufacturer a reasonable profit on them by permitting him to make an accurate advance estimate of the cost of producing such springs.

It is a more specific object of this invention to provide a method and means for heat setting coil springs whereby the spring to be treated is deflected to a specified deflected length, its temperature is raised to relax some of the stresses in it due to its deflection, and during heating the reaction force that the spring exerts against its deflecting load is continuously measured by reference to a force having a value equal to a specified deflecting load, so that heating can be terminated promptly when the reaction force of the spring, deflected to the specified length, is equal to the specified load.

Another specific object of this invention is to provide a method and means for precisely heat setting a spring in the manner described, wherein heating of the spring while it is deflected can be effected by passing an electric current through it, and wherein current flow through the spring can be terminated automatically at that stage in its heating at which its stresses have been relaxed to the required extent, such termination of current flow being effected by the opening of automatic switch means responsive to the changing reaction forces exerted by the deflected spring during heating.

It is also a specific object of this invention to provide very simple and efficient apparatus for practicing the method of this invention, which apparatus requires only unskilled labor for loading springs into it and unloading them from it, and is otherwise fully automatic.

Another object of this invention is to provide apparatus of the character described which can be used with either extension or compression springs, which can be very quickly and accurately set up to heat treat springs for any of a wide range of specifications, and which is very fast in operation so as to be capable of inexpensive high volume production.

With the above and other objects in view which will appear as the description proceeds, this invention resides in the novel method and means substantially as hereinafter described and more particularly defined by the appended claims, it being understood that such changes in the precise embodiment of the hereindisclosed invention may be made as come within the scope of the claims.

The accompanying drawings illustrate two complete examples of the physical embodiment of the invention constructed according to the best modes so far devised for the practical application of the principles thereof, and in which.

The method of this invention, which can be practiced by means of the apparatus shown in the drawings as well as by other forms of apparatus which will be apparent to those skilled in the art, contemplates that a spring to be treated shall be coiled in such a manner that when deflected to a specified length it will exert a reaction force greater than the deflecting force specified for bringing it to that deflected length. In short, a "green" spring to be processed by this method is made too strong.

If a spring is heated while deflected, the reaction force that it exerts under a given deflecting load steadily decreases as its temperature rises. Such relaxation of the spring occurs as the load produced stresses in it are progressively relieved by the increasing temperature. If heating is abruptly terminated at any given point in the relaxation of the spring, and the spring is cooled while being held at the deflected length that it had when heating terminated, the spring will thereafter, whenever it is deflected to that length, exert the same reaction force that it exerted at termination of heating.

The method of this invention utilizes these phenomena of relaxation of a deflected spring during heating and of "setting" of the spring at the termination of heating, and takes advantage of the fact that the reaction force exerted by a spring under deflection is always equal to the load force required to deflect it.

The method of this invention takes account of the fact that there are two values which can vary interdependently as a deflected spring is heated, namely the deflected length of the spring and the reaction force exerted by the spring. The method contemplates the control of one of these values to maintain it constant during the heating of the spring, and the continuous measurement of the other value during heating so that heating can be promptly terminated when the spring, deflected to the specified deflected length, exerts a reaction force that is exactly equal in value to the specified deflecting load.

It will be apparent from what has just been said that the method of this invention lends itself to practice by either of two procedures. In one of these, the spring is subjected during heating to a constant load of the specified value and the deflected length of the spring is permitted to change as the spring relaxes under heat. As it relaxes, its deflected length is continuously measured, and heating is of course terminated when relaxation of the spring brings it to the specified deflected length. The other procedure is utilized in the apparatus hereinafter described, and consists in imposing upon the untreated spring whatever load force is necessary to bring it to the specified deflected length, and holding the spring deflected to that length during the entire heating operation while continuously measuring the decreasing reaction force exerted by the spring. In this procedure heating is of course terminated when the reaction force becomes equal to the specified deflecting load value.

With either procedure the spring is of course held at the specified deflected length during a cooling period following termination of heating.

It will be apparent from the foregoing general explanation that the principles of this invention are equally applicable to both extension springs and compression springs, and can be utilized not only for setting springs to a specified length dimension but also, in other applications, for so setting a coil spring that it will deflect to a specified diameter under a specified torsional load.

Figure 1:
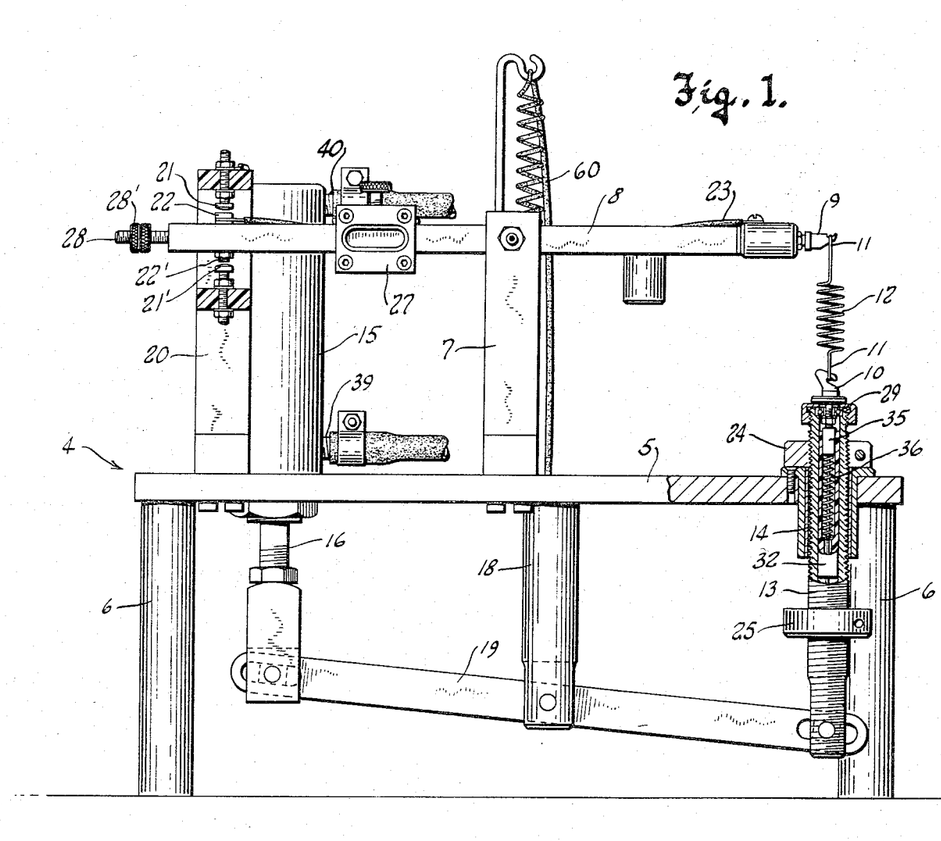
FIGURE 1 is a side elevation view of a machine embodying the principles of this invention, shown in use in the heat treatment of an extension spring.
Figure 2:
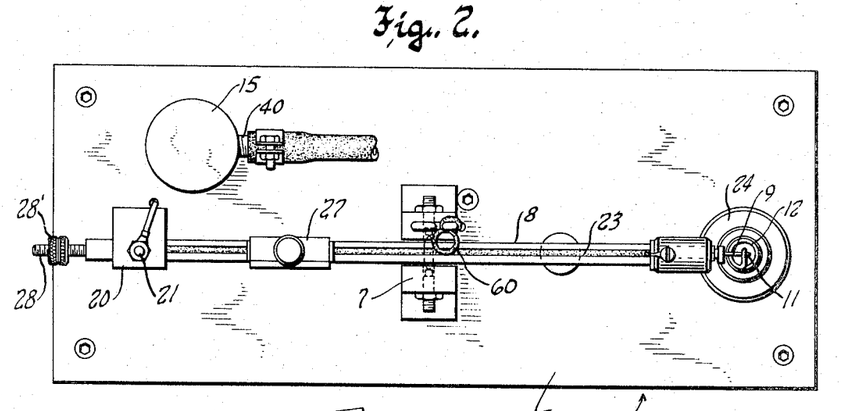
FIGURE 2 is a top plan view of the machine shown in FIGURE 1.
Figure 4:
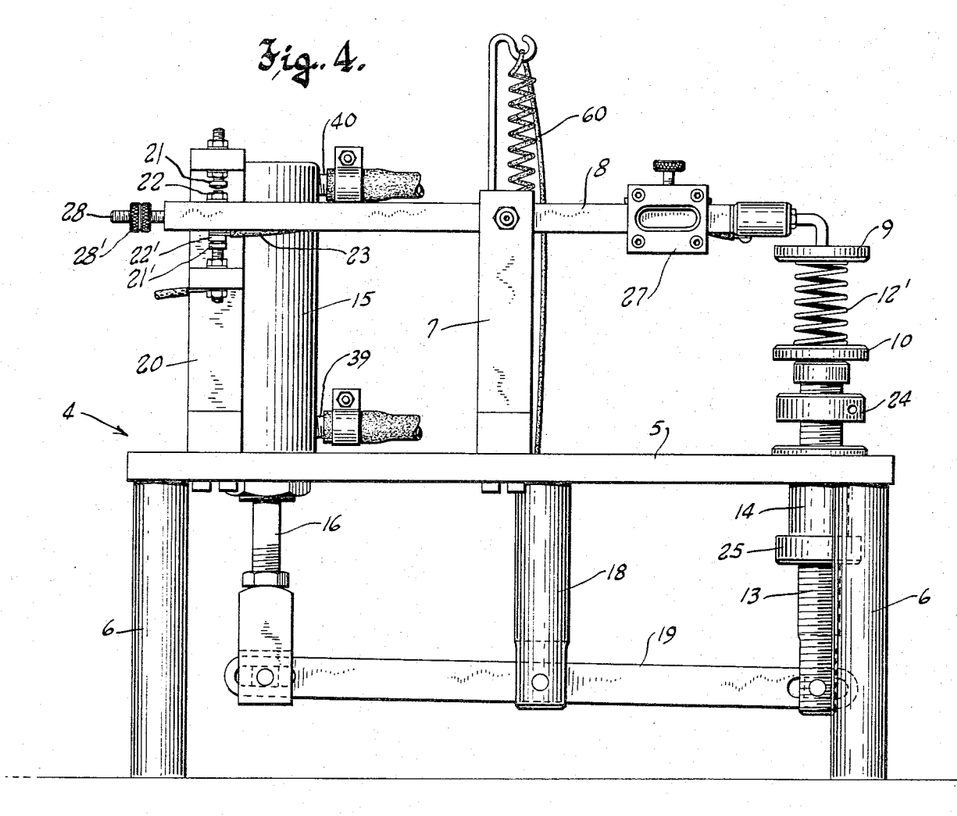
FIGURE 4 is a view generally similar to FIGURE 1 but showing the machine adapted for, and in use with, a compression spring.

Referring now more particularly to the accompanying drawings, the apparatus by which the method of this invention can be practiced comprises, in general, a frame 4 consisting of a plate-like base 5, upright legs 6 on which the base is supported, and a fixed post 7 that projects upwardly from the central portion of the base. The post supports a medially fulcrumed balance lever 8 that is swingable about a horizontal axis spaced above the base. At its front end the balance lever carries an upper electrically conductive spring holder 9, which is located directly above a cooperating lower electrically conductive spring holder 10 that is mounted on the base for up and down movement between defined loaded and unloaded positions. As shown in FIGURE 1 the spring holders 9 and 10 comprise hooks adapted for cooperation with the conventional hooks 11 at the opposite ends of an extension spring 12, but they could also be in the nature of plates or the like, cooperable with the ends of a compression spring 12' confined between them, as illustrated in FIGURE 4. To facilitate adaptation of the machine to different types of springs, the spring holders 9 and 10 are readily removably mounted, and it will be understood that a variety of different spring holders may be kept on hand for use with springs having various types of ends.

The lower defined position of the lower spring holder 10 is its loaded position when the machine is used with extension springs, and its upper limit of motion is then its unloaded position. Conversely, when compression springs are being treated on the machine the loaded position of the lower spring holder 10 is its upper limit of motion and its unloaded position is its lower limit of motion.

The lower spring holder 10 is carried for its up and down motion on a plunger 13 which is axially slidable in a bushing 14 that extends through the base 5 of the frame. The plunger is moved up and down by means of a pneumatic cylinder 15 which is connected to the plunger through a medially fulcrumed actuating lever 19 that extends beneath the base. The air cylinder is mounted in a hole in the base, spaced to one side of the balance lever 8, with its axis substantially vertical and its piston rod 16 projecting beneath the base. A rigid post 18, projecting downwardly from the base, carries the fulcrum for the actuating lever 19, which has its front end pivotally connected with the lower end of the plunger 13 and its rear end similarly connected with the piston rod 16 of the air cylinder.

Near the rear end of the balance lever 8 a fixed terminal post 20 projects upwardly from the base and carries fixed upper and lower electrically conductive abutments or contacts 21 and 21'. These contacts are respectively engageable by upwardly and downwardly facing contactors 22 and 22' on the rear end of the balance lever, so that the contactors and the contacts cooperate to provide both a switch means and a pair of stops whereby swinging of the balance lever is confined between closely spaced limits of motion.

Attention is directed to the fact that the fixed contacts 21 and 21' are electrically insulated from one another. At any given time only one of them is connected in the electric circuit described hereinafter, the other then functioning only as a stop to limit swinging motion of the lever in one direction. However the upper electrically conductive spring holder 9 is at all times electrically connected with both of the lever carried contactors 22 and 22', as by means of a conductor 23.

In the set-up shown in FIGURE 1 the upper fixed contact 21 is connected in an energizing circuit that comprises a current source (not shown) and the lower spring holder 10. Hence when the balance lever is swung to its position in which the contactor 22 engages the contact 21, the upper spring holder 9 is connected into said circuit, so that current can flow through a spring engaged with the spring holders, for resistance heating of the spring. It will be apparent that the upper contact 21 is connected in the circuit to serve as a switch element when expansion springs are being treated on the device, whereas the processing of compression springs requires (see FIGURE 4) that the lower contact 21' be connected in the circuit, the upper contact 21 then serving as an electrically dead stop.

In order to process springs in accordance with the principles of this invention, it is necessary that the springs be held at the specified deflected length during heat treatment, and to that end adjustable means are provided for establishing the upper and lower limits of motion of the plunger 13. Specifically the plunger is threaded along its length and is fitted with correspondingly threaded upper and lower collars 24 and 25, engageable with the top and bottom of the fixed bushing 14 in which the plunger slides, to define, respectively, the lower and upper limits of plunger motion.

When the machine is to be used with extension springs the lower collar 25 is adjusted to define an uppermost unloaded position of the plunger at which the lower spring holder 10 is spaced from the upper spring holder 9 by a distance which is about equal to the untensioned length of the springs to be processed, so that such springs can be readily engaged with and disengaged from the spring holders when the plunger is in its unloaded position. The upper collar 24 must be carefully adjusted so that the distance between the spring holders, measured with the balance lever in a position at which its contactors 22 and 22′ are equispaced from the contacts 21 and 21′, is equal to the specified deflected length to which the springs are to be set.

Obviously when compression springs are to be treated the upper collar 24 will be adjusted to define a lowermost unloaded position of the plunger at which the distance between the spring holders will substantially equal the undeflected length of the springs to be processed, and the lower collar will be so adjusted as to define a loaded position of the plunger in which the distance between the spring holders, measured with the balance lever in its position just mentioned, is equal to the specified deflected length of the springs.

It will be apparent that when the plunger is actuated from its unloaded to its loaded position a spring engaged with the spring holders will be deflected to substantially its specified deflected length. Because the "green" spring, as newly loaded into the machine, is stronger than it is required to be after heat treatment, the air cylinder should be capable of exerting upon the lower spring holder a loading force of substantially higher value than the specified deflecting load. And since the reaction force of the "green" spring, when brought to its specified deflected length, is substantiallly higher than the specified deflecting load value, the spring will of course impose a biasing force upon the balance lever by which the lever will be swung to a switch closed position at which it is stopped by whichever of the fixed contacts 21 or 21′ is connected in the electrical circuit as such contact is engaged by its cooperating lever carried contactor 22 or 22′.

At the same time that the spring is exerting its reaction force upon the upper spring holder 9 to bias the balance lever to its switch closed position, an opposite biasing force is being exerted upon that spring holder, tending to urge the balance lever away from its switch closed position, and of a value equal to the specified deflecting load. The value of the switch opening biasing force is controllable by means of a balance weight 27 that is mounted on the lever 8 for sliding adjustment along its length. The balance weight will be positioned somewhere along the rear arm of the lever, as shown in FIGURE 1, when the apparatus is used for treating expansion springs, and somewhere along the front arm, as illustrated in FIGURE 4, when compression springs are to be treated. A threaded endwise extension 28 of the rear arm of the lever has a nut 28′ adjustable back and forth thereon to provide for fine adjustments of the deflecting load value.

The deflecting load value is of course set into the machine by connecting a suitable weighing scale to the upper spring holder 9, or, when setting up for tension springs, by hanging on it a mass having a weight equal to the specified load force. Alternatively, of course, calibration marks can be made on the arms of the balance lever. Adjustments are made in the same manner as with a conventional balance beam scale. Note that the deflecting load value adjustment is made with no spring in the machine, so that the force and length adjustments are made entirely independently of one another, thereby facilitating set-up.

It will now be apparent that an operator need only load a "green" spring into the machine and then actuate the air cylinder to move the plunger 13 to its loaded position, whereupon treatment of the spring takes place entirely automatically until the spring has cooled and is ready to be unloaded from the machine. Deflection of the spring when the plunger moves to its loading position closes the switch means comprising cooperating contacts 21 and 22 or 21′ and 22′, sending current through the spring. As the temperature of the spring rises, it relaxes, but as long as its reaction force exceeds the specified deflecting load value the spring will overcome the opposing load force upon it, holding the switch closed so that resistance heating of the spring continues. However when the spring has relaxed to the point where its reaction force exactly equals the specified deflecting load value, the opposing forces on the upper spring holder 9 are brought into equilibrium, and the balance lever swings in the direction to open the switch, thus promptly terminating current flow through the spring. The "dead" one of the two stationary contacts 21 and 21′ confines the balance lever against swinging more than a very slight distance away from its switch closed position, and thus insures that during the cooling period following termination of current flow the loading force which the upper spring holder imposes upon the spring will not deflect the latter substantially beyond its specified deflected length.

Figure 3:
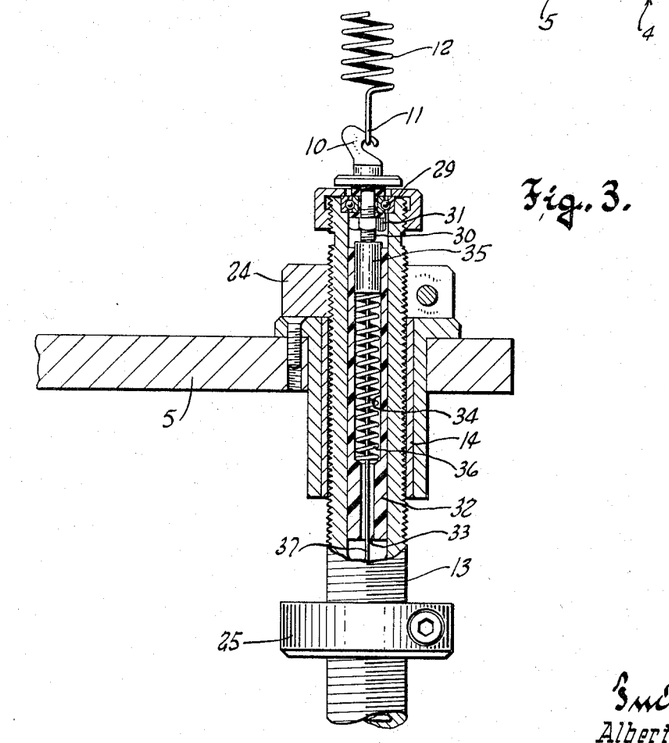
FIGURE 3 is a vertical sectional view on an enlarged scale of the lower spring holder and plunger of the machine shown in FIGURE 1.

During heat treatment a carbon steel spring coils up slightly as it relaxes, while a stainless steel spring uncoils. To accommodate such coiling or uncoiling of the spring the lower spring holder 10 is mounted for free rotation about an axis aligned with that of the spring, as by means of a ball bearing 29 carried in the upper end of the plunger, and means are provided for connecting the spring holder in the electrical circuit without interfering with its rotation. As best seen in FIGURE 3, the lower spring holder has a stem portion 30 which extends through the inner race of bearing 29 and is confined against end play relative thereto, as by a nut 31. (It will be understood that the outer race of bearing 29 is mounted in a manner to confine it against axial motion relative to the plunger.) The body of the plunger is tubular and there is press fitted into it a brush holder 32 of insulating material having a downwardly opening bore 33 and an upwardly opening counterbore 34. A brush 35, slidable in the counterbore 34, is biased upwardly into engagement with the bottom of the stem portion 30 by means of a small compression spring 36 reacting against the shoulder defined by the junction of the bore and counterbore, and a conductor 37 connected with the brush and extending downwardly through the spring 36 and the bore 33 provides for connection of the brush 35 and hence the lower spring holder into the resistance heating circuit.

To provide for both upward and downward propulsion of the plunger 13, the pneumatic cylinder 15 is of the double acting type, having a lower pressure air port 39 and an upper pressure air port 40. A solenoid valve 41 (shown diagrammatically in FIGURE 5) controls flow of compressed air from a source thereof (not shown) to the air cylinder ports, and the connections between the solenoid valve and the cylinder are made to be readily interchanged so that the appropriate port connections can be made in accordance with whether extension springs or compression springs are to be treated.

Figure 5:
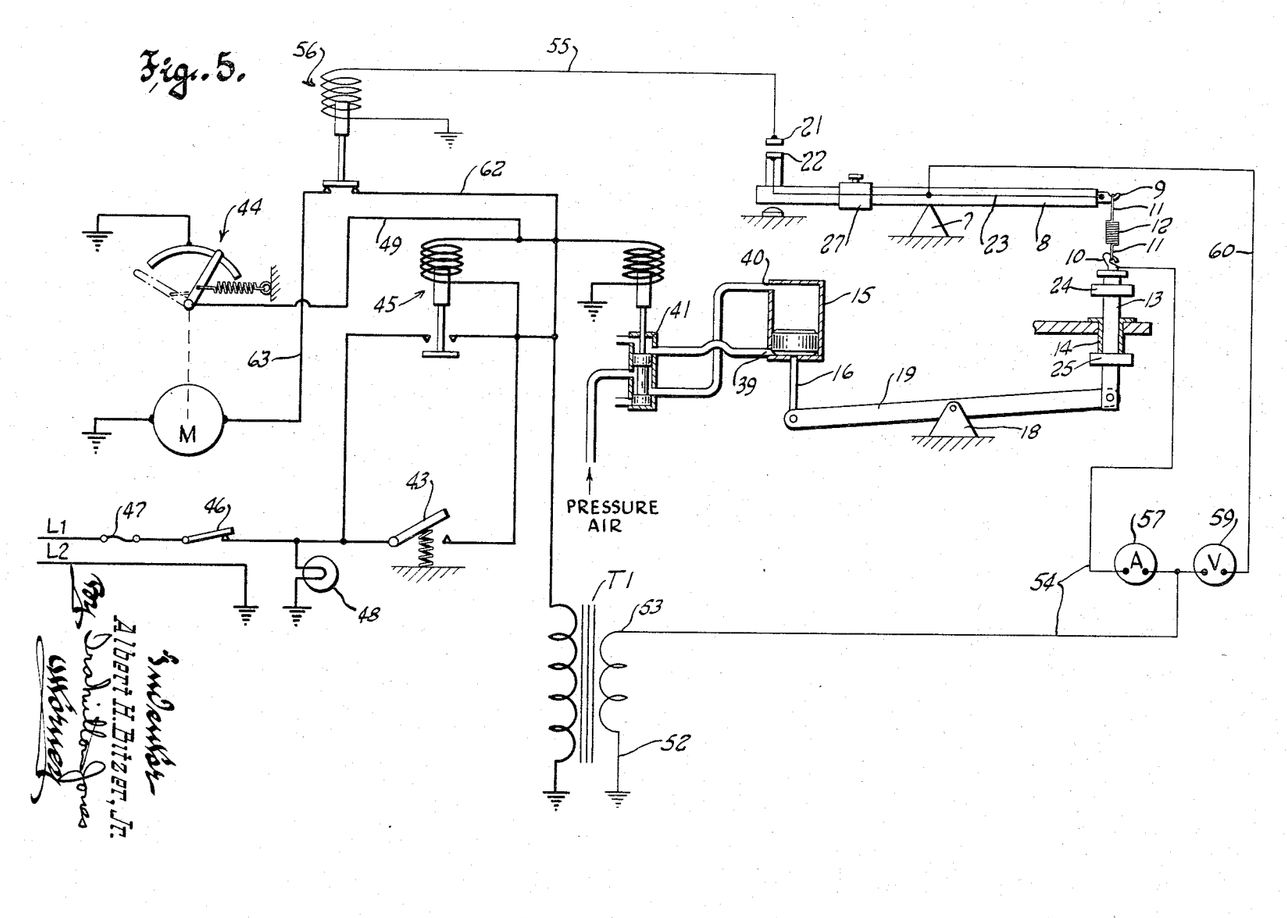
FIGURE 5 is an electrical circuit diagram of the control apparatus by which operation of the machine is rendered substantially automatic, the apparatus being shown in the condition that obtains when a spring has been loaded into it but before actual heat treatment has started.

The apparatus illustrated diagrammatically in FIGURE 5 affords completely automatic operation of the machine, requiring only that an operator load springs into the machine, close a momentary contact switch 43 (preferably actuated by a foot pedal) when a spring 12 is engaged with the spring holders 9 and 10, and disengage the spring from the holders when the lower spring holder 10 returns to its unloading position at the completion of the cycle, following a cooling period which is determined by a self-returning timer mechanism 44 of known type.

Specifically, closure of the switch 43 energizes a normally open relay 45 from a line current source comprising mains $L_1$ and $L_2$. A master switch 46, fuse 47 and pilot light 48 are connected in the main circuit in a conventional manner. The relay 45 is wired to be self-holding, and its winding circuit is completed by means of a conductor 49 connected with the normally closed switch means 50 of the timer mechanism 44, so that relay 45 remains energized (closed) until the timer mechanism has run through its preset time interval. Closure of relay 45 energizes the solenoid valve 41 that controls the air cylinder, thereby sending pressure air to the appropriate port 39 or 40 of the air cylinder to effect movement of the plunger 13 to its loaded position. The consequent loading of the spring closes the switch means comprising cooperating contact elements 21 and 22 or 21' and 22'.

Closure of relay 45 also connects the primary of a stepdown transformer $T_1$ with the main circuit. One terminal 52 of the transformer secondary is grounded. From its other secondary terminal 53 current flows by way of a conductor 54 to the lower spring holder 10, through the spring 12 to the upper spring holder 9, thence, by way of the closed contact elements 21–22 (or 21'–22' if the spring is of the compression variety) and another conductor 55, to the winding of a normally closed low voltage relay 56, and through said winding to ground. If desired, an ammeter 57 can be connected in the low voltage spring heating circuit just described, and a voltmeter 59 can be connected between the ungrounded terminal 53 of the transformer secondary and the upper spring holder 9 to indicate the voltage across the spring. The connection between the voltmeter and the upper spring holder comprises a conductor 60 which is connected to a terminal located at the fulcrum of the balance lever so that said conductor will not impose any biasing force upon the lever or interfere with its swinging motion.

The purpose of the low voltage relay 56 is to prevent the timer 44 from starting until heating of the spring has been terminated, so that the time interval established by the timer will be solely that for cooling and will be independent of the duration of the heating period. To this end the low voltage relay 56 has one of its switching terminals connected, by means of a conductor 62, in parallel with the energizing circuits for the transformer primary and the solenoid valve, while its other switching terminal is connected, by means of a conductor 63, with the ungrounded terminal of the motor M of the timer mechanism. Hence the winding of the low voltage relay is energized, to open the timer motor circuit, as soon as current flows through the switch means actuated by the balance lever.

It will now be apparent that normally open relay 45 remains closed through the entire cycle of operation, until the timer mechanism runs to the end of its preset cooling interval, and hence the air valve solenoid 41 and the transformer primary remains energized during the entire operating cycle. As long as the switch means operated by the balance lever remains closed, heating current flows through the spring and the winding of low voltage relay 56, and the latter prevents the timer motor M from running.

When the spring 12 has been relaxed to the point where the contact elements 21 and 22 (or 21' and 22'), separate, current flow through the spring of course terminates, and current flow through the winding of the low voltage relay 56 likewise terminates, permitting said relay to close and complete the timer motor energizing circuit, thus starting the timer running through its preset cooling period. When the timer mechanism reaches the end of its delay period, it effects opening of the energizing circuit for the winding of self-holding relay 45, and that relay promptly opens, with the result that the solenoid air valve 41 is de-energized, connecting the supply of compressed air to the opposite port of the air cylinder to move the plunger 13 to its unloaded position. Opening of self-holding relay 45 also disconnects the transformer primary from the mains, insuring against inadvertent application of heating current to the spring and likewise preventing energization of the motor M of the timing mechanism. Since the timer mechanism automatically returns to its initial position as soon as relay 45 opens, the apparatus is automatically set up for the initiation of another cycle by closure of the momentary contact switch 43.

From the foregoing description taken together with the accompanying drawings it will be apparent that this invention provides a simple, accurate and efficient method and means for heat treating coil springs so as to impart to them a set such that they will deflect to exactly a specified length when subjected to a specified deflecting load; that the method of this invention can constitute the only heat treatment required in the manufacture of precision coil springs; that the practice of this method eliminates waste in the production of such coil springs and reduces inspection requirements to mere spot checking for quality control purposes; and that the apparatus by which the method can be practiced may be substantially wholly automatic and capable of operation of unskilled labor.

An advantage of this invention which may not be apparent from what has been said above, but which has been found to be very important, is that a spring that has been calibrated or set by the method and/or the apparatus herein described is unaffected by any ambient temperature below that at which the spring was set. In other words, such a spring is stable at high ambient temperatures, and up to an ambient temperature equal to the temperature that the spring had attained at the instant heating terminated during the setting process. Since the terminal temperatures of such springs during setting are relatively high, being in some cases as high as 900° F., a spring manufacturer using the method and apparatus of this invention is in a position to supply springs that will not lose load at specified ambient temperature limits.

What is claimed as my invention is:

1. The method of heat treating a coil spring so that it will have a specified deflected length when subjected to a load of a specified value, which method is characterized by the following steps:
   (A) deflecting the spring to the specified length;
   (B) heating the spring while maintaining it deflected to the specified length;
   (C) as the spring is heated, measuring the reaction force that it exerts;
   (D) promptly terminating heating when the reaction force exerted by the spring becomes equal to the specified load value; and
   (E) cooling the spring while holding it deflected to the specified deflected length.

2. The method of heat treating a coil spring to give it a set such that it will have a specified deflected length when it is subjected to a load of a specified value, which method comprises:
   (A) connecting the spring in an electric circuit that comprises a current source and a switch having a contactor that is movable to open and closed positions and which in its closed position can connect the spring with the current source so that current flows through the spring for resistance heating thereof;
   (B) deflecting the spring to its specified deflected length;
   (C) imposing the reaction force of the deflected spring upon the contactor of the switch in a direction to urge the contactor to its closed position; and (D) imposing upon the contactor of the switch a biasing force of a value equal to the specified load and in a direction to urge the contactor to its open position so that the switch opens to terminate current flow through the spring when the reaction force of the spring becomes equal to the specified load.

3. The method of claim 2, further characterized by the step of: holding the spring deflected to its specified deflected length during a cooling period following termination of current flow through the spring.

4. The method of heat setting a spring so that it will have a specified relationship between deflecting load and a dimension of the spring which varies proportionally to load, such that said dimension will be of a specified magnitude whenever a specified deflecting load is applied to the spring, which method comprises:
(A) subjecting the spring to a deflecting load;
(B) while the spring is deflected, steadily raising its temperature;
(C) while the spring is being heated, and by reference to a force of a known value and a dimension standard of known value, measuring the relationship between the reaction force exerted by the spring and the magnitude of said dimension; and
(D) promptly terminating heating of the spring when the relationship between the magnitude of said dimension and the reaction force that the spring exerts becomes equal to the specified relationship between said dimension and deflecting load.

5. The method of heat treating a spring to give it a set such that a load of a specified value will so deflect the spring that a dimension thereof which varies proportionally to load will have a specified deflected magnitude, which method comprises:
(A) deflecting the spring to bring said dimension thereof to the specified deflected magnitude;
(B) while the spring is so deflected, passing an electric current through it to steadily raise its temperature by resistance heating;
(C) as the temperature of the spring rises, measuring the reaction force exerted by the spring against a force of the specified load value;
(D) promptly terminating current flow through the spring when the reaction force of the spring becomes equal to said force of the specified load value; and
(E) maintaining the spring deflected to maintain said dimension thereof at the specified deflected magnitude during a cooling period following termination of current flow through the spring.

6. The method of heat treating a spring to cause it to take a set such that a dimension of the spring which varies proportionally to load will have a specified deflected magnitude when the spring is subjected to a load of a specified value, which method comprises:
(A) heating the spring while subjecting it to a deflecting load force;
(B) so controlling the load force applied to the spring while it is being heated that the spring is not deflected beyond the point at which said dimension of the spring has the specified magnitude;
(C) as the temperature of the spring increases during heating, measuring the magnitude of said dimension of the spring and the reaction force exerted by the spring; and
(D) promptly terminating heating of the spring when the spring is deflected to the specified magnitude of said dimension and exerts a reaction force equal to the specified load value.

7. The method of heat treating a spring to give it a set such that a dimension of the spring which varies proportionally to load will have a specified deflected magnitude when the spring is subjected to a load of a specified value, which method comprises:

(A) deflecting the spring to and maintaining it at the specified magnitude of said dimension;
(B) raising the temperature of the spring while it is so deflected;
(C) while heating the spring, continuously measuring the difference between the reaction force exerted by the spring and a reference force equal to the specified value; and
(D) promptly terminating heating when said difference becomes zero.

8. The method of heat treating a spring so that when it is subjected to a load of a specified value a dimension of the spring that varies proportionally to load will have a specified deflected value, which method comprises:
(A) imposing a deflecting load on the spring, the amount of which is determined by reference to a standard having one of said specified values, so as to establish one of the values of reaction force of the spring and deflected magnitude of said dimension of the spring equal to said one specified value;
(B) heating the spring while so deflecting it;
(C) while heating the spring, measuring the other of said values of reaction force of the spring and deflected magnitude of said dimension of the spring by reference to another standard having the other of said specified values; and
(D) promptly terminating heating of the spring when the measured value becomes equal to said other standard.

9. Apparatus for causing a coil spring to take a set such that it has, to within very close tolerance limits, a predetermined length under a specified deflecting load, said apparatus comprising:
(A) a first electrically conductive spring holder cooperable with one end of a spring to be treated and and fixable in a defined spring deflecting position;
(B) a second electrically conductive spring holder cooperable with the other end of a spring to be treated;
(C) means mounting said second spring holder for motion along a defined path aligned with the first spring holder, to and from a defined position toward which the second spring holder is biased by a spring confined between said holders, said spring holders when in their said defined positions cooperating to hold a spring engaged between them deflected to substantially its said predetermined length;
(D) means biasing the second spring holder away from its defined position with a force equal in value to the specified deflecting load;
(E) electric switch means having a contactor movable between switch open and switch closed positions;
(F) means providing a motion transmitting connection between the second spring holder and the contactor of the switch means whereby the contactor is held in its switch closed position as long as the second spring holder is in its defined position and is moved to its switch open position in consequence of movement of the second spring holder away from its defined position; and
(G) means defining an electrical energizing circuit comprising, in series,
(1) a source of current,
(2) the switch means, and
(3) the spring holders,
so that current passes through a spring engaged with the spring-holders as long as the second spring holder is in its defined position, as when a spring engaged with the holders exerts a force upon the second spring holder that is in excess of the specified load, and so that current flow through the spring is automatically terminated when the force exerted by the spring equals said specified load.

10. In apparatus for heat treating a spring to give it a set such that it deflects to a specified length when it is subjected to a deflecting load of a specified value:
(A) a first spring holder cooperable with one end of a spring to be heat treated to hold the same in a fixed position during heat treatment;
(B) a second spring holder cooperable with the other end of a spring to be heat treated and movable along a defined path toward and from the first spring holder so as to be biased in one direction of its motion by the reaction force of a spring to be heat treated engaged with said holders under deflection;
(C) means defining a position of the second spring holder along its path of motion at which a spring engaged with said holders will have said specified deflected length;
(D) means biasing the second spring holder in the opposite direction of its motion with a force equal to said specified load value, so that when a deflected spring engaged with said spring holders relaxes during heat treatment, the second spring holder can move to its said position in response to the force of said biasing means at the reaction force exerted by the spring decreases to the specified load value;
(E) switch means having a contractor movable between switch open and switch closed positions; and
(F) means providing a motion transmitting connection between the second spring holder and the switch contactor whereby the latter is moved from one of its positions to the other in consequence of movement of the second spring holder in its said opposite direction to its said position.

11. The apparatus of claim 10 wherein said means (subparagraph C) defining said position of the second spring holder comprises a stop toward which said holder can be biased by a spring engaged with the holders, further characterized by: means mounting the first spring holder for motion along a defined path aligned with the path of the second spring holder, between a first position at which the first spring holder cooperates with said stop to hold a spring engaged with the holders deflected to its specified length, and a second position in which substantially no load is imposed upon a spring engaged with the holders.

12. In apparatus for heat treating a coil spring so as to cause it to take a set such that it will have a specified length under a specified deflecting load:
(A) a first spring holder adapted for force transmitting engagement with one end of a coil spring;
(B) a second spring holder adapted for force transmitting engagement with the other end of a coil spring and constrained to motion in a defined path aligned with the first spring holder, to and from a defined position toward which the second spring holder is adapted to be biased by a spring with which said holders are engaged;
(C) means for fixing the first spring holder in a defined position such that a spring having its opposite ends engaged with said holders and biasing the second spring holder toward its said defined position is maintained deflected by said holders to its said specified length;
(D) means biasing the second spring holder away from its defined position with a force equal to said specified deflecting load, so that said second spring holder is held in its said position only so long as a spring engaged with said holders exerts a reaction force which exceeds the value of said specified load;
(E) means for heating a spring confined between the spring holders, said means being controllable to provide for abrupt termination of heating;
(F) electric switch means having a contactor movable to switch open and switch closed positions; and
(G) means providing a motion transmitting connection between the second spring holder and the contactor of the electric switch means whereby the contactor is maintained in one of its positions so long as the second spring holder is in its said defined position, and whereby the contactor is moved to its other position by movement of the second spring holder away from its said position, so that heating of a spring confined between the spring holders can be promptly terminated when the second spring holder moves out of its said position.

13. The apparatus of claim 12 wherein said spring holders are electrically conductive, and wherein said contactor is maintained in its closed position so long as the second spring holder is in its said defined position, further characterized by the fact that said heating means comprises an electrical energizing circuit that includes said spring holders, said switch means, and a current source, connected in series, so that current from said source can flow through a spring engaged with said spring holders to effect resistance heating of the spring as long as the contactor is in its switch closed position.

14. Apparatus for causing a coil spring to take a set such that it has a specified deflected length when it is subjected to a specified deflecting load, said apparatus comprising:
(A) means providing a fixed frame;
(B) a force applying member on the frame comprising
  (1) a first electrically conductive spring holder cooperable with one end of a spring, and
  (2) means for fixing said first spring holder in a predetermined position;
(C) a lever fulcrumed about an axis fixed with respect to the frame;
(D) a second electrically conductive spring holder cooperable with the other end of a spring, said second holder being carried on an arm of said lever for motion therewith toward and from the first holder;
(E) an electrical contactor on said lever, spaced from its fulcrum and electrically connected with the second spring holder;
(F) a fixed electrical contact on the frame connectable in a series circuit with the first spring holder and with a source of current and engageable by the contactor
  (1) to complete a circuit by which current from the source is caused to flow through a spring engaged with the holders, for resistance heating of the same, and
  (2) to provide a stop defining a limit of swinging motion of the lever in one direction, at which limit a spring engaged by the holders has substantially the specified deflected length when the first spring holder is in its said predetermined position;
(G) means biasing the second spring holder in the opposite direction with a force equal to the specified load so that the contactor remains engaged with the fixed contact as long as a deflected spring engaged with the holders exerts a reaction force which is greater than the force exerted by said biasing means; and
(H) an abutment on the frame engageable by the lever to define a limit of its swinging motion in the opposite direction to which limit the lever is urged by said biasing means and by which the spring can be maintained at substantially its specified deflected length during a cooling period following termination of current flow through it.

15. The apparatus of claim 14, further characterized by the fact that said force applying member comprises: means on the frame for moving the first spring holder along a defined path aligned with the second spring holder, between said predetermined position and a second position at which substantially no load is imposed upon a spring engaged with the spring holders.

(References on following page)

References Cited by the Examiner

UNITED STATES PATENTS

| | | | |
|---|---|---|---|
| 1,830,222 | 11/1931 | Brindle | 140—89 X |
| 2,261,878 | 11/1941 | Hathaway | 219—50 X |
| 2,526,915 | 10/1950 | Trimble | 29—173 X |

ANTHONY BARTIS, *Primary Examiner.*

RICHARD M. WOOD, *Examiner.*

B. A. STEIN, *Assistant Examiner.*